UNITED STATES PATENT OFFICE 2,350,675

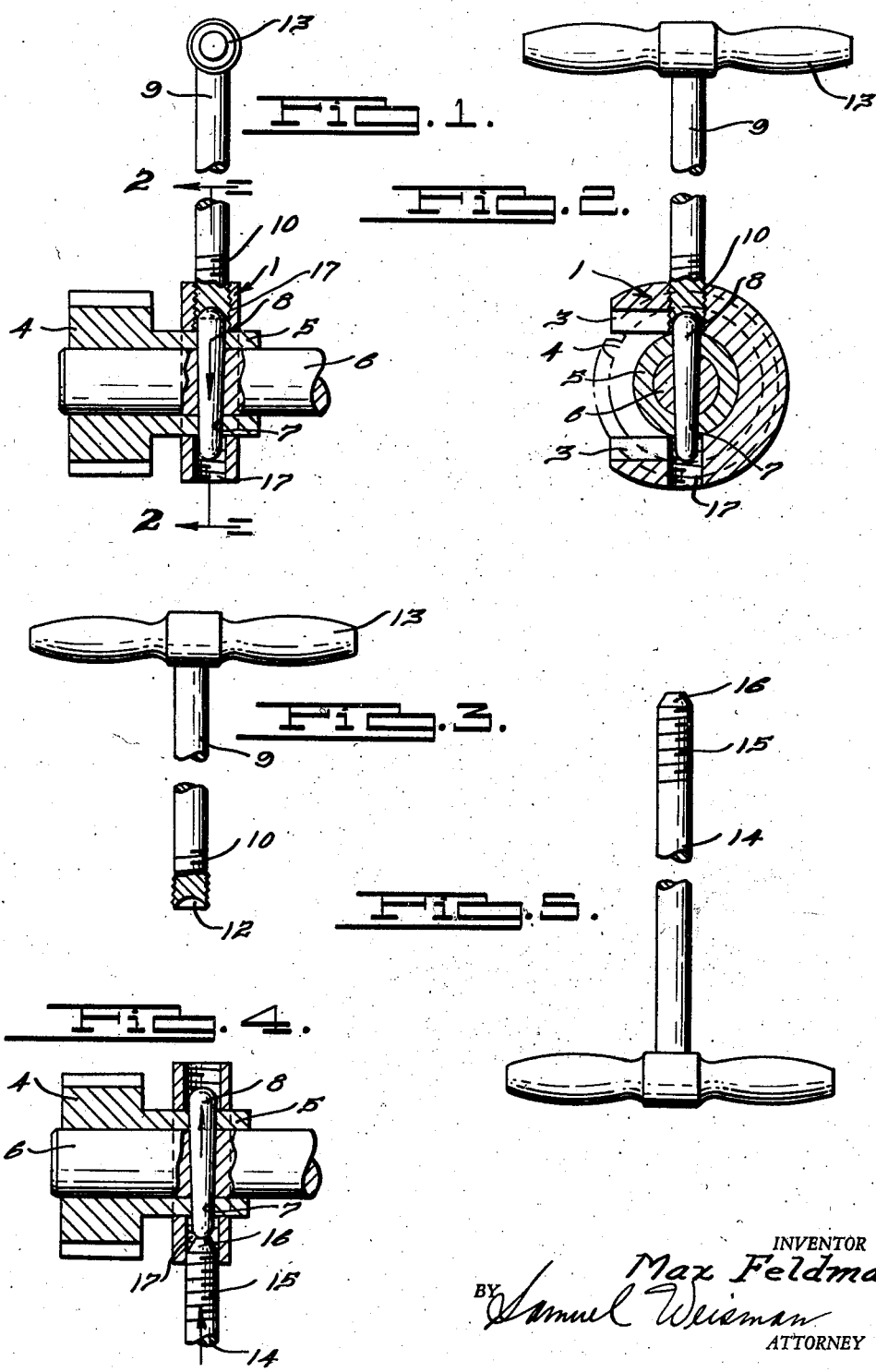

PIN DRIVER AND GAUGE

Max Feldman, Detroit, Mich., assignor of one-third to David M. Miro, Detroit, Mich.

Application December 7, 1942, Serial No. 468,059

2 Claims. (Cl. 29—86.1)

The present invention pertains to a novel pin driver and gauge and is designed for the general purpose of driving a pin through a cylindrical member. It may be used, for example, in pinning the hub of a gear on a shaft or fastening the hub of a gear or a pulley wheel to a shaft by means of a pin, as in calculating machines, cash registers, motion picture machines, and so forth, and in machines of larger or smaller dimensions.

In certain accurate assembly operations, the extent of projection of the pin from both sides of the outer member or hub is specified. Accordingly, one of the objects of the invention is to provide a gauge incorporated in the driver for limiting the movement of the leading end of the pin. Consequently, if the length of the pin is accurate, the extent of projection of the other or trailing end will also be correct.

Heretofore it has been customary, at least in one such assembly operation, to use a tapered pin, insert it by hand and drive it home with a hammer. The blow of the hammer occasionally distorts the parts, especially if they are made of light metal. Moreover, it has been exceedingly difficult to maintain accuracy. It will be evident that these difficulties are overcome by the use of a self-gauging driver.

Another object of the invention is to provide a driver that is self-locating over the pin, after the latter has been partially inserted by hand. The interior of the driver is formed with grooves that receive the protruding ends of the pin. The threaded driving element is located over the head of the pin, and the opposite groove determines the final position of the pin as previously set forth.

Further objects of the invention are to provide a small, compact and durable device, adapted also for expelling a pin as will appear in the detailed description.

The invention is fully disclosed by way of example in the following description and in the accompanying drawing in which:

Figure 1 is a vertical section of the device in driving position;

Figure 2 is a section on the line 2—2 of Figure 1;

Figure 3 is an elevation, partly in section, of the driver;

Figure 4 is a vertical section of the device in expelling position, and

Figure 5 is an elevation, partly in section, of a modified form of driver.

Reference to these views will now be made by use of like characters which are employed to designate corresponding parts throughout.

The body of the device is a substantially U-shaped member 1 preferably made of a suitable hard steel. The internal bottom 2 is accurately finished on a radius and extending over an arc of at least 180°. Since the device is designed for accurate work, the radius corresponds to that of the member over which the body is to be fitted. It will be understood in this connection that a different body is required for each size of work.

Along each end or arm of the body 1 is formed an internal groove 3. The purpose of these grooves can best be described with reference to the assembly shown in Figure 2. The spur gear 4 has a hub 5 which is to be secured on a shaft 6. The hub and the shaft are suitably drilled at 7 to receive a tapered pin 8. The pin is inserted by hand, while the driver is used merely to drive it home. The grooves 3 receive the projecting ends of the pin, and in this respect the device is self-locating.

Through one of the arms of the body a driving member is directed towards the other arm. This member is generally in the form of a stem 9 threaded at 10 into the arm. The inner extremity is formed as a concave seat 12 to engage the head of the pin being driven in. The opposite end of the member 9 is formed with a handle 13. In special cases the driving member may be considerably shortened and connected by a flexible shaft to a remote point.

For removing the pin from the assembly, a different driving member is preferably used. This member 14 is also threaded at 15 but is formed with a tapered or pointed extremity 16 to engage the smaller end of the pin 8.

Both arms may be tapped at 17 so that the driving member may be received in either one. However, the groove 3 opposite the driving member serves as a gauge to limit the extent of the driving movement. A different driver is obviously required for each set of different dimensions depending on the length and location of the pin to be driven.

Improperly sized holes and pins are common in the use of tapered surfaces. If the pin is driven in too far, it will enter the lower hole 17 and the gauge cannot be removed. In such case, the operator reverses the device on the shaft and pushes the pin back. Oversize holes and undersize pins are detected in this manner. On the other hand, if the pin is not driven in far enough, its upper end will remain in the upper hole 17 and prevent the gauge from being pulled off.

Undersize holes and oversize pins are thus detected. Such holes would be re-reamed.

When the pins and holes are within the tolerance, the operator with some experience can feel the maximum pressure necessary to drive the pin home and thereby maintain the required accuracy of 1/64 of an inch or even less. Pins driven too far or not far enough will be detected as described above in connection with improperly fitting pins.

Although specific embodiments of the invention have been described, it may be understood that various alterations may be made without departing from the scope of the invention, as indicated by the appended claims.

What I claim is

1. A pin driver comprising a substantially U-shaped body adapted to be fitted on a cylinder, said body having a curved bottom and spaced legs, the inner side of the bottom of said body being accurately finished on a radius corresponding to that of the cylinder, said body having a groove along the inner surface of each leg, said grooves being directly opposite each other, a threaded aperture extending through one leg and into its groove, and a driving member threaded in said aperture, whereby the last named groove permits slipping said body over a partially inserted pin in a cylinder and the other groove determines the driving of the pin.

2. A pin driver as claimed in claim 1, said body having a threaded hole directly opposite said driving member and adapted to receive said member.

MAX FELDMAN.